United States Patent [19]
Liu et al.

[11] Patent Number: 5,398,079
[45] Date of Patent: Mar. 14, 1995

[54] HALF-PIXEL INTERPOLATION FOR A MOTION COMPENSATED DIGITAL VIDEO SYSTEM

[75] Inventors: Vincent Liu, San Gabriel; John Fox, San Diego, both of Calif.

[73] Assignee: General Instrument Corporation, Hatboro, Pa.

[21] Appl. No.: 9,831

[22] Filed: Jan. 27, 1993

[51] Int. Cl.⁶ .................................. H04N 7/137
[52] U.S. Cl. ............................ 348/699; 348/718
[58] Field of Search ............ 348/409, 413, 416, 699, 348/718; 364/723; 382/45; H04N 7/137

[56] References Cited

U.S. PATENT DOCUMENTS

| | | | |
|---|---|---|---|
| 4,802,006 | 1/1989 | Iinuma | 348/412 |
| 4,816,906 | 3/1989 | Kummerfeldt | 348/402 |
| 4,827,340 | 5/1989 | Pirsch | 348/412 |
| 4,897,720 | 1/1990 | Wu | 348/412 |
| 5,134,475 | 7/1992 | Johnston et al. | 348/415 |
| 5,162,907 | 11/1992 | Keating | 348/699 |

*Primary Examiner*—Howard W. Britton
*Attorney, Agent, or Firm*—Barry R. Lipsitz

[57] ABSTRACT

A scheme is provided for processing previous frame data in a motion compensated digital video system to interpolate pixels used in reconstructing a current video frame. Pixel data from a previous video frame is arranged into sub-blocks containing a plurality N of pixels. The sub-blocks are stored in a memory to enable the retrieval of at least one sub-block per memory access cycle. A plurality M of sub-blocks are retrieved from the memory in response to a displacement vector associated with a portion of a current video frame. M is less than or equal to N and the M sub-blocks are retrieved in no more than M memory access cycles. A subset of pixels is chosen from the selected plurality of sub-blocks for use in interpolating pixels for the current video frame portion. The subset of pixels is processed over no more than N memory access cycles to provide N interpolated pixels for the current video frame portion.

11 Claims, 6 Drawing Sheets

HALF-PIXEL INTERPOLATION FOR A MOTION COMPENSATED DIGITAL VIDEO SYSTEM

BACKGROUND OF THE INVENTION

The present invention relates to the compression of digital data, and more particularly to a method and apparatus for interpolating pixels in a motion compensated digital video system.

Television signals are conventionally transmitted in analog form according to various standards adopted by particular countries. For example, the United States has adopted the standards of the National Television System Committee ("NTSC"). Most European countries have adopted either PAL (Phase Alternating Line) or SECAM standards.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels". A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green, and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding is usually used to transmit only the difference between an actual frame and a prediction of the actual frame. The prediction is based on information derived from a previous frame of the same video sequence. Substantial efficiency can be achieved due to the significant amount of frame-to-frame redundancy that is typical in television program signals.

An example of a video compression system using motion compensation is described in Ninomiya and Ohtsuka, "A Motion-Compensated Interframe Coding System for Television Pictures," *IEEE Transactions on Communications*, Vol. COM-30, No. 1, January 1982. The motion estimation algorithm described therein is of the block-matching type. In this case, a motion vector is determined for each block in the current frame of an image by identifying a block in the previous frame which most closely resembles the particular block. The entire current frame can then be reconstructed at a decoder by sending the difference between the corresponding block pairs, together with the motion vectors that are required to identify the corresponding pairs. Often, the amount of transmitted data is further reduced by compressing both the displaced block differences and the motion vector signals. Block matching motion estimation algorithms are particularly effective when combined with block-based spatial compression techniques such as the discrete cosine transform (DCT).

Other examples of motion compensation systems can be found in U.S. Pat. No. 4,802,006 to Iinuma, et al., entitled "Signal Processing Unit for Producing a Selected One of Signals Predictive of Original Signals," U.S. Pat. No. 4,816,906 to Kummerfeldt, et al., entitled "Method for Motion-Compensated Frame-to-Frame Prediction Coding," U.S. Pat. No. 4,827,340 to Pirsch, entitled "Video-Signal DPCM Coder with Adaptive Prediction," U.S. Pat. No. 4,897,720 to Wu, et al., entitled "Circuit Implementation of Block Matching Algorithm," and European patent publication no. 0 237 989 to Takenaka, et al., entitled "Differential Coding Apparatus Having an Optimum Predicted Value Determining Circuit." In such prior art systems, a search area in a previous frame is typically searched by placing a block of pixels from the current frame at the upper left-hand corner of the search area and calculating the error (e.g., mean square or mean absolute) with respect to the overlapped pixels in the search area. The block from the current frame is then moved pixel by pixel to the right-hand boundary of the search area. At each step the error with respect to the overlapped pixels of the search area is calculated. The block of the current frame is then moved down one row of pixels in the search area and again moved pixel by pixel from the left-hand boundary of the search area to the right-hand boundary. This process continues until an error function is calculated for all possible block positions in the search area.

When the prediction of a current frame block from a previous frame block is good, i.e., the prediction frame bears a close resemblance to the frame to be transmitted, only a small amount of residual error remains for transmission. This leads to a high compression efficiency. If a bad prediction is made, then the residual error may be so large that the compression efficiency is adversely affected. Thus, an accurate prediction of the frame-to-frame movement in a video sequence is essential in achieving a high compression ratio.

For a typical video sequence, the scene may contain many objects that move independently at various speeds and directions. In order to ease hardware implementation and limit the amount of information needed to represent each movement, a frame of video is often segmented into rectangular blocks as noted above. One then assumes that only the blocks are moving with independent speeds and directions. In order to reduce system complexity and increase speed, the area which is searched for the best match between a current frame block and a previous frame block may be limited to the neighborhood around the target block. This limitation in the search area is usually acceptable because the movement of an object in most typical video sequences is seldom fast enough to create a large displacement from one frame to the next. With a limited search area, it is possible to efficiently perform an exhaustive search to find the best match. Once the best match is found, the prediction frame is constructed by assembling all the best matching blocks together. To implement this in hardware, the previous frame is stored in a random access memory and the prediction frame is generated block by block from the memory by reading one pixel at a time using the proper displacement vector for that block.

This method produces a good prediction frame when the objects in a video sequence are displaced both vertically and horizontally by an integer number of pixels. However, for a typical video sequence, the object movements are not usually an integral number of pixels in distance. For those cases where the displacement falls between two pixels, a better prediction frame can be generated by using values that are interpolated from adjacent pixels. If one considers only the midpoints between pixels, there are three possible modes of interpolation, i.e., horizontal, vertical and diagonal. Horizontal interpolation consists of taking the average of two horizontally adjacent pixels. Vertical interpolation is generated by computing the average between two vertically adjacent pixels. Diagonal interpolation requires the averaging of four neighboring pixels.

One method of implementing interpolation in a prediction scheme is to store the previous frame in a random access memory and to perform the interpolation on a pixel by pixel basis. For diagonal interpolation, it is necessary to access four pixels from memory in order to compute one interpolated value. For horizontal and vertical interpolation, two pixels are needed to generate one interpolated pixel. Thus, for any of the three interpolation modes, the number of memory access cycles needed to obtain the pixels necessary for interpolation exceeds the number of interpolated pixels that are generated. This fact reduces the throughput of the system to a point where it may not be practical.

Another method for implementing interpolation is to precompute the interpolated values for the entire search window based on each of the three interpolation modes. The precomputed values are stored in three separate memories. When the block displacement vector uses any one of the three interpolative modes, the prediction block is generated by accessing the appropriate memory. The requirement for three additional memories in such a scheme is obviously disadvantageous in view of the hardware complexity and cost.

It would be advantageous to provide a new method for generating interpolated pixels that is efficient, relatively easy to implement, and cost effective. Such a scheme should not require the use of additional memories. Also, the number of memory access cycles should be limited to no more than the number of interpolated pixels generated. The present invention provides a method and apparatus enjoying these and other advantages.

SUMMARY OF THE INVENTION

In accordance with the present invention, a method is provided for processing previous frame data in a motion compensated digital video system to interpolate pixels used in reconstructing a current video frame. Pixel data from a previous video frame is arranged into sub-blocks containing a plurality N of pixels. The sub-blocks are stored in a memory to enable the retrieval of at least one sub-block per memory access cycle. A plurality M of the sub-blocks is retrieved from the memory in response to a displacement vector associated with a portion of a current video frame. M is less than or equal to N. The M sub-blocks are retrieved in no more than M memory access cycles. A subset of pixels is chosen from the selected plurality of sub-blocks for use in interpolating pixels for the current video frame portion. The subset of pixels is processed over no more than N memory access cycles to provide N interpolated pixels for the current video frame portion.

N is at least the maximum number of pixels necessary to obtain an interpolated pixel using a desired interpolation algorithm. For example, where diagonal interpolation is desired, N must be at least four, since diagonal interpolation requires the averaging of four pixels. In an illustrated embodiment, the step of arranging pixel data into sub-blocks comprises evenly dividing blocks of pixels from the previous video frame into sub-blocks. Thus, and merely for example, a block of sixteen pixels that is four pixels wide and four pixels high could be subdivided into four sub-blocks each two pixels high by two pixels wide.

Horizontal, vertical and diagonal interpolation can be provided using up to four previous frame pixels to obtain each interpolated current frame pixel. In this instance, the processing step of the inventive method comprises the steps of selecting four pixels from the subset of pixels for use in interpolating a current frame pixel. Two of the selected four pixels are averaged in response to a horizontal or vertical interpolation control signal. All of the selected four pixels are averaged in response to a diagonal interpolation control signal in order to obtain an interpolated pixel.

Apparatus is provided in accordance with the present invention for interpolating pixels used in reconstructing a current video frame from pixels of a previous video frame in a motion compensated digital video system. Memory means store sub-blocks, each containing a plurality N of pixels from the previous video frame. Means are provided for retrieving a plurality M of sub-blocks from the memory means in response to a displacement vector associated with a portion of a current video frame for which pixels are to be interpolated. M is less than or equal to N and the M sub-blocks are retrieved in no more than M access cycles of the memory means. Means are provided for choosing a subset of pixels from the retrieved plurality of sub-blocks for use in interpolating pixels for the current video frame portion. The subset of pixels is processed by processing means over no more than N memory access cycles to provide N interpolated pixels for the current video frame portion. In a preferred embodiment, N is at least the maximum number of pixels necessary to obtain an interpolated pixel using a desired interpolation algorithm. The current video frame portion for which pixels are to be interpolated can comprise a block of pixels corresponding in size to an integer number of the sub-blocks.

The processing means can provide horizontal, vertical and diagonal interpolation using up to four previous frame pixels to obtain each interpolated current frame pixel. Such processing means comprise means for selecting four pixels from the subset of pixels for use in interpolating a current frame pixel and means for averaging two of the selected four pixels in response to a horizontal or a vertical interpolation control signal in order to obtain a horizontally or vertically interpolated pixel, and means for averaging all of the selected four pixels in response to a diagonal interpolation control signal in order to obtain a diagonally interpolated signal.

The sub-blocks can have a horizontal dimension K and a vertical dimension L. In this instance, the selecting means can comprise a plurality K+1 of shift registers, each having L+1 stages for collectively holding the subset of pixels. Multiplexer means, coupled to selected outputs of the shift registers, provide a different group of four previous frame pixels from the shift registers to the averaging means each memory access cycle. Each group of previous frame pixels can comprise an upper left-hand corner pixel $P_0$, an upper right-hand corner pixel $P_1$, a lower right-hand corner pixel $P_2$, and a lower left-hand corner pixel $P_3$ defining a square. In such an embodiment, the averaging means can comprise first means for outputting the sum, divided by two, of pixel $P_0$ and pixel $P_1$ in response to the horizontal interpolation control signal. Second means output the sum, divided by two, of pixel $P_0$ and pixel $P_3$ in response to the vertical interpolation control signal. Third means output the sum, divided by four, of pixels $P_0$, $P_1$, $P_2$ and $P_3$ in response to the diagonal interpolation control signal. The first, second and third means can comprise conventional add, subtract and multiplier circuits.

DESCRIPTION OF A PREFERRED EMBODIMENT

The present invention enables the efficient interpolation of pixels for noninteger displacements in a motion compensated digital video system. In digital video processing, each frame of video is digitized into rows of picture elements, referred to as "pixels." In a preferred embodiment of the present invention, each video frame is segmented into rectangular blocks that are i pixels wide and j pixels high. For each frame of video to be transmitted, referred to as the "current frame," there is a corresponding "previous frame" that is derived by compressing and decompressing the preceding frame of video. A prediction of the current video frame can be made from the previous frame. In order to generate this prediction, the movement of each block in the current frame is estimated by comparing it to the previous frame.

The frame-to-frame movement of a block can be represented by a displacement vector which comprises a horizontal component and a vertical component. The horizontal and vertical components are not necessarily limited to an integral number of pixels in length. The process of "motion estimation" finds the displacement vector in the previous frame that will lead to the best estimate for a block in the current frame.

Figure 1:
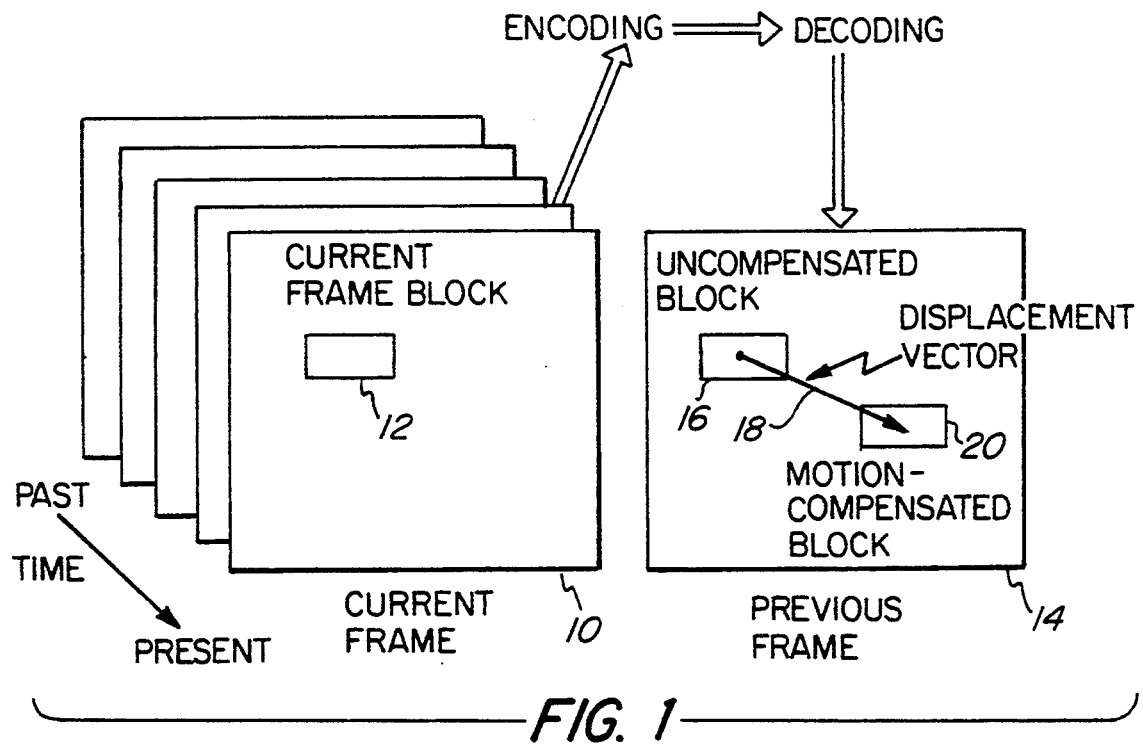
FIG. 1 is a diagrammatic illustration showing how a current frame block is predicted from a motion compensated block of a previous frame.

Referring to FIG. 1, for each block 12 of a current frame 10, there exists in the previous frame 14 a corresponding block of pixels 16 referred to as the uncompensated block. For cases where both the horizontal and vertical components of a displacement vector 18 are an integral number of pixels, a motion compensated block 20 is defined to be a block of pixels derived from the uncompensated block by shifting its horizontal and/or vertical boundaries by the amount specified in the displacement vector.

In those cases where the motion estimation process generates displacement vectors that are nonintegers, the motion compensated blocks are obtained through interpolation. In particular, for horizontal vector components that are not integers, the motion compensated block is derived from the uncompensated block by first shifting the uncompensated block with a truncated displacement vector and then by averaging each pixel in the shifted block with the pixel to its immediate right. Truncation of the displacement vector removes the noninteger portion of the vector. Thus, for example, in a case where the horizontal component of the displacement vector is 5.5 and the vertical component is 3.0, the horizontal component will be truncated to 5.0 and horizontal interpolation will be performed. This situation is illustrated in FIG. 2.

Figure 2:
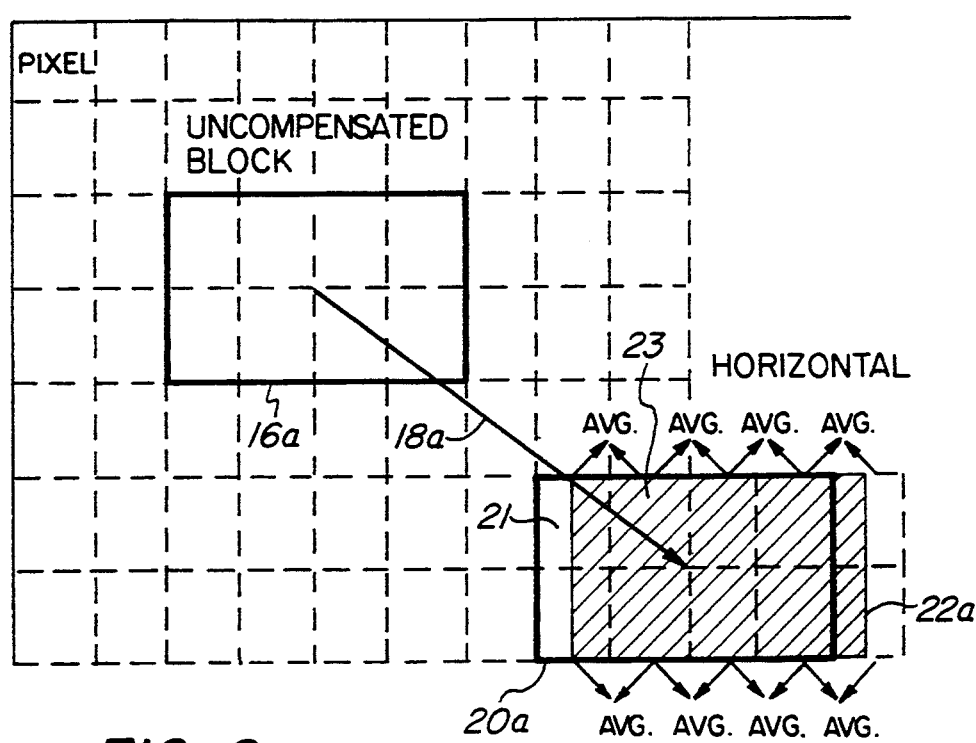
FIG. 2 is a diagrammatic illustration showing the horizontal interpolation of a sub-block.

Referring to FIG. 2, an uncompensated block 16a is shifted by motion vector 18a (5 across, 3 down) to the position illustrated by partially motion compensated block 20a. In reality, the horizontal component of the motion vector is 5.5 which would yield a fully motion compensated block 22a. In order to obtain fully motion compensated block 22a, partially motion compensated block 20a (obtained using integer displacement vector components) is interpolated using horizontal interpolation. The interpolation is performed by averaging pairs of horizontally adjacent blocks as indicated in FIG. 2. Thus, for example, the upper left-hand pixel of motion compensated block 22a is obtained by averaging pixels 21 and 23 of partially motion compensated block 20a. Each of the other pixels of motion compensated block 22a is determined by averaging the two pixels it overlaps in block 20a.

Figure 3:
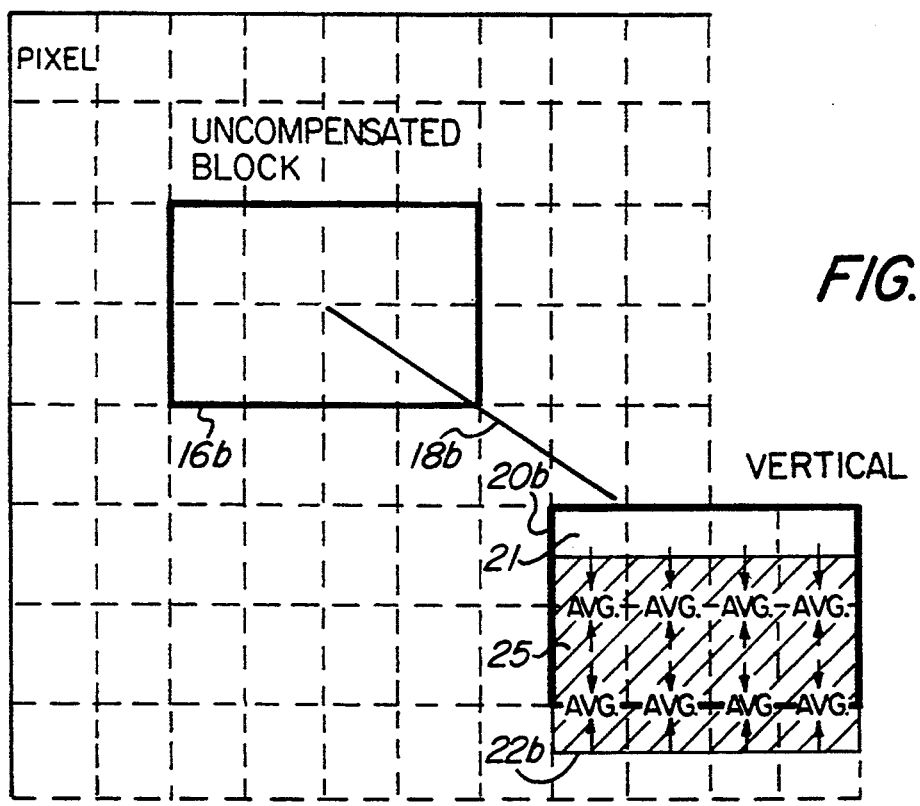
FIG. 3 is a diagrammatic illustration showing the vertical interpolation of a sub-block.

For vertical displacement vector components that are nonintegers, the motion compensated block is derived in a similar fashion except that the averaging is computed vertically. This is illustrated in FIG. 3 wherein uncompensated block 16b is shifted by motion vector 18b to obtain partially motion compensated block 20b.

Motion vector 18b (5, 3) has been truncated from the noninteger value (5, 3.5). In order to obtain fully motion compensated block 22b, vertical interpolation is performed. For example, to obtain the upper left-hand pixel in motion compensated block 22b, pixels 21 and 25 from block 20b are averaged. Each of the other pixels in motion compensated block 22b is obtained by averaging the pixels of block 20b which the desired pixel overlaps.

Figure 4:
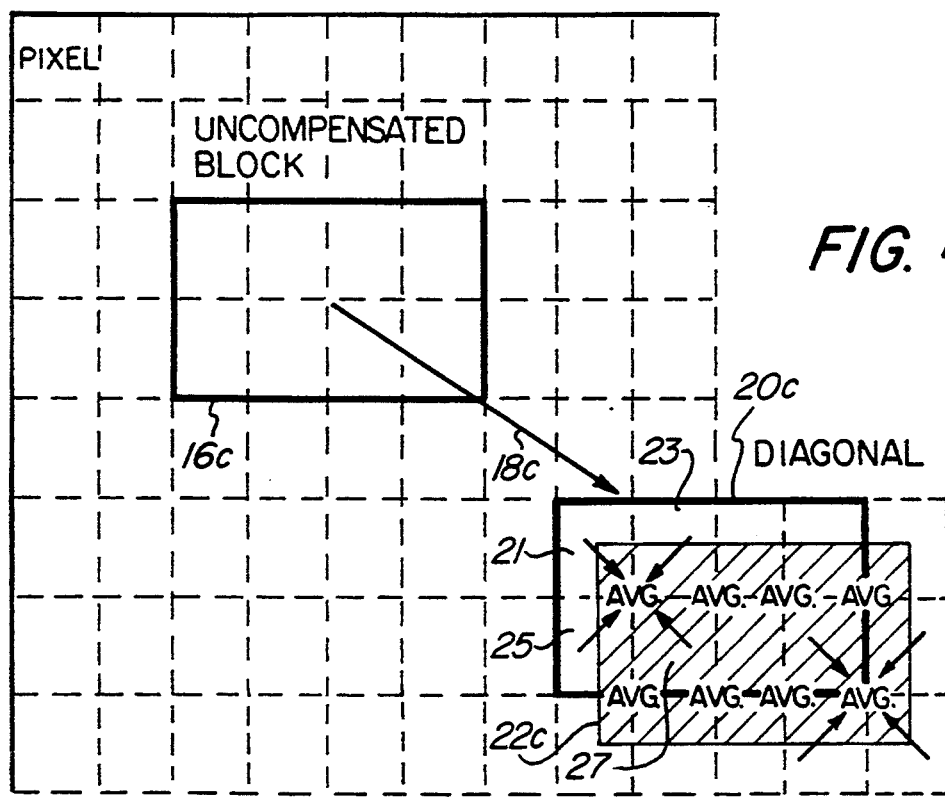
FIG. 4 is a diagrammatic illustration showing the diagonal interpolation of a sub-block.

If both of the displacement vector components are nonintegers, an average of four pixels is computed. The four pixels consist of the shifted pixel, one pixel to its right, one pixel immediately below it, and the pixel that is at the lower right-hand corner of the group of four pixels. This is illustrated in FIG. 4, where an uncompensated block 16c is shifted by truncated motion vector 18c (5, 3) to obtain partially motion compensated block 20c. In order to obtain fully motion compensated block 22c, the four pixels of block 20c that are overlapped by each pixel of block 22c are averaged. Thus, for example, to obtain the upper left-hand corner pixel of block 22c, pixels 21, 23, 25 and 27 of block 20c are averaged. The interpolated pixels in block 22c correspond to a displacement of the uncompensated block by 5.5 in the horizontal direction and 3.5 in the vertical direction.

The displacement vectors may be generated by any kind of motion estimation algorithm. With the displacement vector known for any block of video in the current frame, the motion compensated blocks may be retrieved and interpolated from the previous frame memory data in accordance with the present invention. In particular, the present invention provides a unique way of organizing the previous frame memory and the access cycles to that memory to provide one interpolated pixel for each memory access cycle.

In accordance with the present invention, each block of pixels in the previous frame is subdivided into rectangular sub-blocks of K×L pixels. K represents the horizontal dimension of the sub-block and L represents the vertical dimension thereof. There is some freedom in the choice of K and L, provided that each sub-block contains at least the maximum number of pixels required to obtain an interpolated pixel using a desired interpolation algorithm. In the example set forth above, the maximum number of pixels required to obtain an interpolated pixel is four. This represents the four pixels necessary to obtain each diagonally interpolated pixel, as illustrated in FIG. 4.

The choice of K and L is also constrained by the requirement that an even number of sub-blocks fit into each block. The previous frame memory is set up such that each memory location stores one sub-block. Thus, for each memory access cycle, a full sub-block containing at least the number of pixels required to interpolate a new pixel is obtained. All of the pixels for a block are obtained in an even number of memory access cycles. Where each pixel is eight bits in length, a random access memory with a data bus K×L×8 bits wide is used to store the previous frame pixels. Since each pixel is eight bits wide, each memory location can store one sub-block of pixels to achieve the aforementioned advantages. It should be appreciated that the number of bits defining each pixel can be changed, in which event the width of the random access memory would have to be changed accordingly.

In a system where diagonal interpolation is required, the motion compensated sub-block can be determined by retrieving pixels from four sub-blocks. Specifically, suppose that a sub-block in the current frame has a displacement vector of ($d_h$, $d_v$) and the uncompensated sub-block in the previous frame is located at memory address ($u_h$, $u_v$). Due to the interpolation between pixels, the computation of the motion compensated sub-block requires pixels from four sub-blocks. The four sub-blocks are located at memory addresses:

($MC_h$ $MC_v$), ($MC_h+1$ $MC_v$), ($MC_h$ $MC_v+1$) and ($MC_h+1$ $MC_v+1$)

where the column and row addresses $MC_h$ and $MC_v$ are calculated from the equations:

$$MC_h = U_h + \text{integer truncation of}\left(\frac{d_h}{K}\right)$$

$$MC_v = U_v + \text{integer truncation of}\left(\frac{d_v}{L}\right).$$

Figure 5:
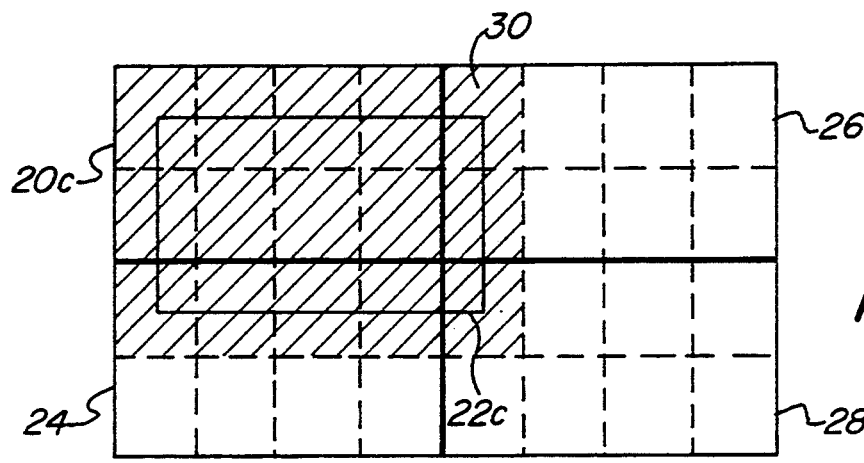
FIG. 5 is diagrammatic illustration showing the selection of a subset of pixels from a plurality of sub-blocks to provide a diagonal interpolation of a sub-block.

Not every pixel in the four sub-blocks is needed in the interpolation process. For a diagonally interpolated sub-block, the number of pixels needed equals (K+1 by L+1). This is illustrated in FIG. 5, which depicts the diagonal interpolation of FIG. 4 in greater detail. Specifically, in order to do the diagonal interpolation, four sub-blocks 20c, 24, 26 and 28 were retrieved from the previous frame memory. In order to interpolate the eight pixels for motion compensated block 22c, the 15 pixels represented by the shaded area 30 are necessary. It is noted that diagonal interpolation requires the use of more pixels than just horizontal interpolation or vertical interpolation. For horizontal interpolation, only (K+1) by L pixels are used. For vertical interpolation, K by (L+1) pixels are necessary.

By storing sub-blocks, each containing at least the maximum number of pixels required to interpolate a new pixel (i.e., the four pixels necessary for diagonal interpolation), only four memory access cycles are needed to generate a motion compensated sub-block with the proper interpolation. Since each sub-block contains four or more pixels, the previous frame memory requires no more than one access cycle to provide enough information to interpolate one new pixel on an ongoing basis. This provides a significant advantage over the traditional memory organization which stores one pixel per memory location. If one were to perform interpolation using a traditional memory scheme, the number of access cycles per pixel will usually exceed one.

Figure 6:
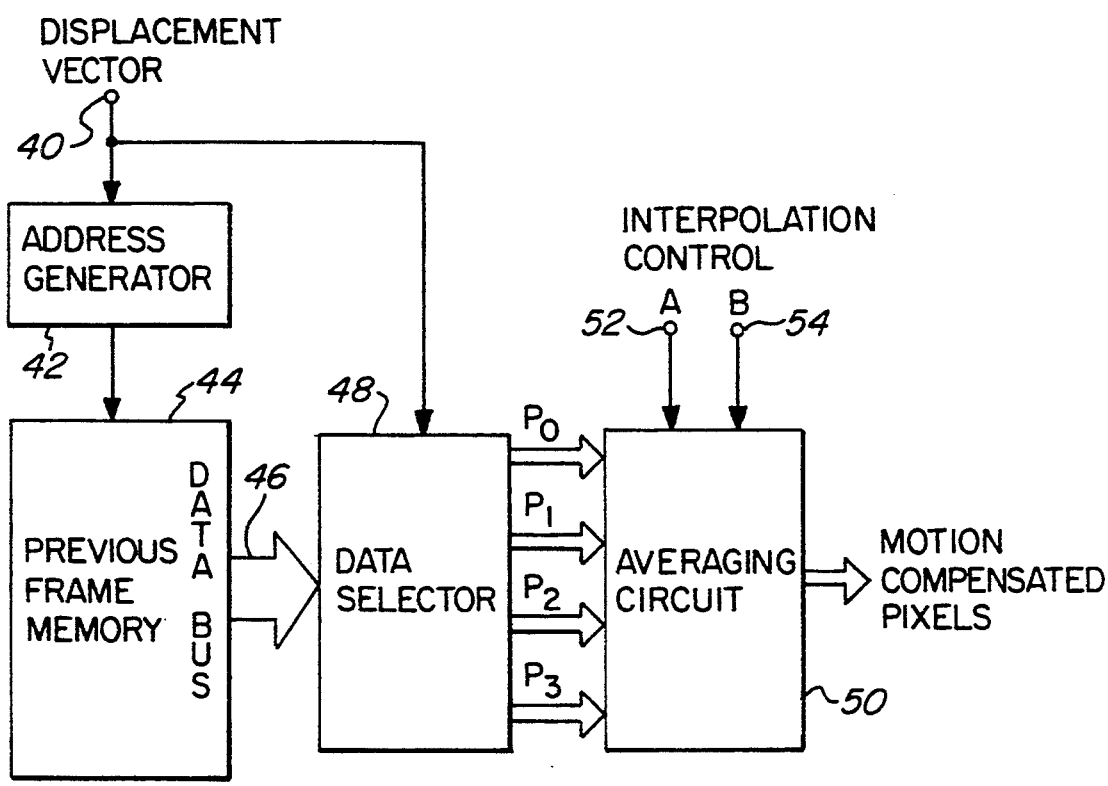
FIG. 6 is a block diagram of apparatus in accordance with the present invention.

FIG. 6 is a block diagram of a hardware implementation that can be used to practice the present invention. The displacement vector corresponding to a received data block is input to an address generator 42 and data selector 48 via terminal 40. The address generator truncates the displacement vector and addresses the previous frame memory 44 to output the four sub-blocks required to interpolate the pixels for a motion compensated sub-block. Data selector 48 receives the sub-block pixel data via data bus 46 and selects only those pixels that are necessary for interpolation. Data selector 48 produces four parallel streams of pixels $P_0$, $P_1$, $P_2$ and $P_3$ which are passed on to an averaging circuit 50 that performs the interpolation. Interpolation control signals input to terminals 52 and 54 instruct averaging circuit 50 to either provide no interpolation, vertical interpolation, horizontal interpolation, or diagonal interpolation.

The interpolation control signals are determined by examining the original displacement vector, prior to truncation, to determine if half pixel interpolation is necessary in either the horizontal, vertical or diagonal direction. If both the horizontal and vertical displacement vector components are integers, no interpolation will be necessary. If just the horizontal component is a noninteger, horizontal interpolation is necessary. If just the vertical component is a noninteger, vertical interpolation will be required. If both the horizontal and vertical components are nonintegers, diagonal interpolation will be required.

During each clock cycle, referred to herein as a memory access cycle, there are four pixels at the output ports of data selector 48. These represent the four corner pixels in a diagonal interpolation scheme, e.g., pixels 21, 23, 25 and 27 illustrated in FIG. 4. More specifically, $P_0$ represents the upper left-hand corner pixel (e.g., pixel 21), $P_1$ represents the upper right-hand corner pixel (e.g., pixel 23), $P_2$ represents the lower left-hand corner pixel (e.g., pixel 25), and pixel $P_3$ represents the lower right-hand corner pixel (e.g., pixel 27).

Figure 7:
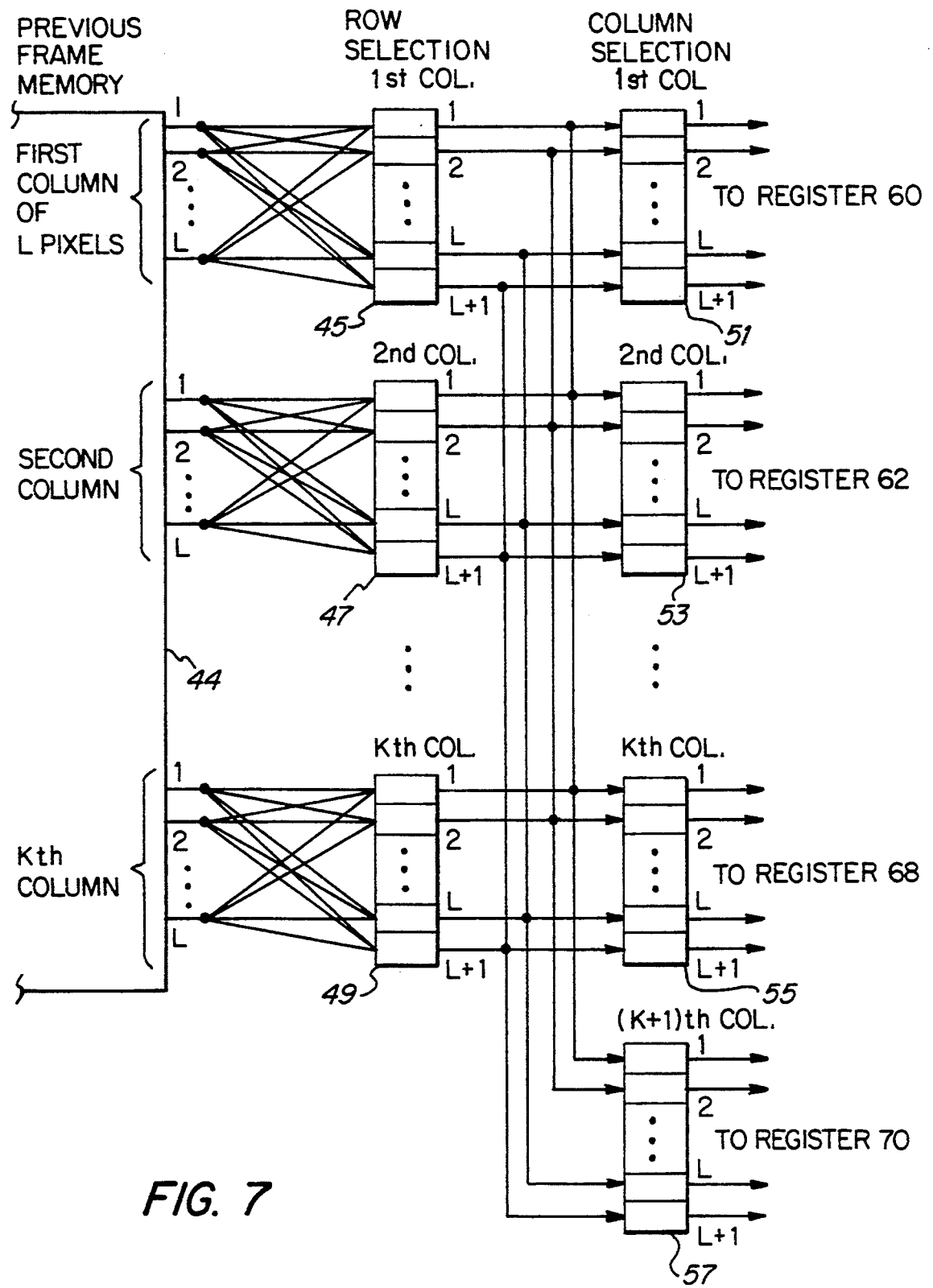
FIGS. 7 and 8 are a schematic diagram of an embodiment of a data selector that can be used in the circuit of FIG. 6.
Figure 8:
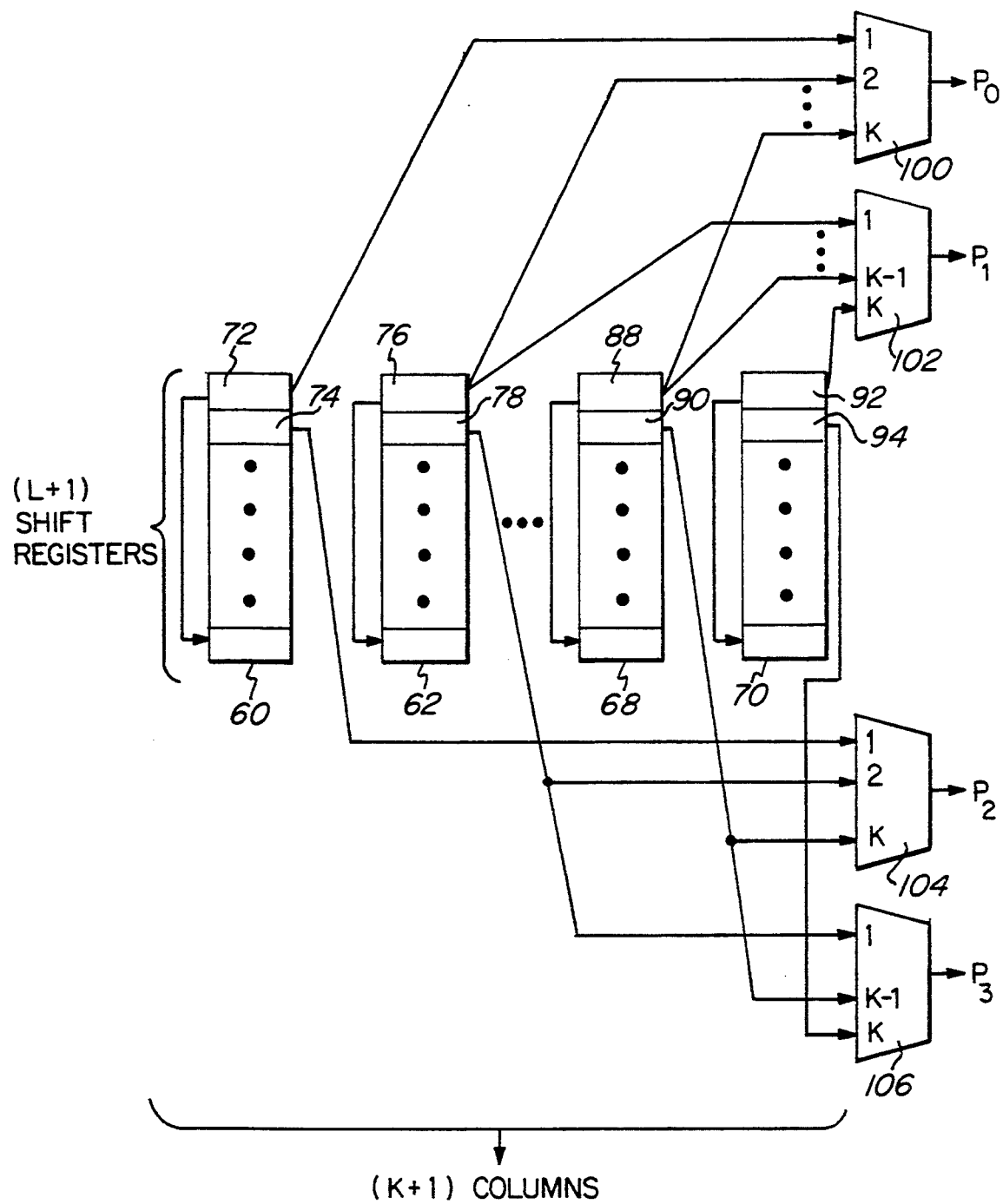

Data selector 48 is implemented in terms of a two-dimensional array of shift registers. Its structure is illustrated in FIGS. 7 and 8. More specifically, FIG. 7 illustrates a front end of the data selector that receives the necessary sub-blocks from previous frame memory 44 in response to a displacement vector associated with a portion of a current video frame, e.g., a video block currently being reconstructed. The front end of FIG. 7 also chooses the subset of pixels necessary from the retrieved sub-blocks to interpolate a sub-block of pixels for the current video frame portion. Such a subset of pixels is represented by shaded portion 30 of FIG. 5.

From the four sub-blocks 20c, 24, 28 and 26 illustrated in FIG. 5, the pixels 30 that are needed for interpolation can be selected by specifying which rows and columns of pixels are to be retained. More specifically, the following rows and columns are retained from each sub-block:

upper left sub-block:
  column ($d_h$ modulo K)+1 through column K;
  row ($d_v$ modulo L)+1 through row L;
upper right sub-block:
  column 1 through column ($d_h$ modulo K)+1;
  row ($d_v$ modulo L)+1 through row L;
lower left sub-block:
  column ($d_h$ modulo K)+1 through column K;
  row 1 through row ($d_v$ modulo L)+1;
lower right sub-block:
  column 1 through column ($d_h$ modulo K)+1;
  row 1 through row ($d_v$ modulo L)+1.

As indicated above, $d_h$ and $d_v$ are the horizontal and vertical displacement vectors, respectively. In the example shown in FIG. 5, K is 4 and L is 2. The displacement vectors have their modulo values shown as:

($d_h$ modulo K)=1 and ($d_v$ modulo L)=1.

The front end of FIG. 7 consists of two multiplexer/register stages. The first stage uses registers 45, 47 ... 49 to provide row selection. The second stage uses registers 51, 53 ... 55, 57 to provide column selection. The input from previous frame memory 44 is one sub-block of K by L pixels. This sub-block of pixels is temporarily stored in registers 45, 47 ... 49 which select the rows that are to be retained and positions the pixels into the proper rows so they can be subsequently loaded into the two-dimensional array of shift registers illustrated in FIG. 8. Second stage registers 51, 53, ... 55, 57 select from the first stage only those columns that are to be retained. The surviving pixels remain in the column selection registers 51, 53, ... 55, 57 until all of the desired pixels from each of the four sub-blocks have been selected. These pixels are collected together in the column selection registers and subsequently loaded into the two-dimensional shift register array depicted in FIG. 8. Specifically, the selected pixels retained in register 51 are output to register 60 of FIG. 8. The selected pixels from register 53 are output to register 62 of FIG. 8. The selected pixels from register 55 are output to register 68 of FIG. 8. Likewise, the selected pixels from register 57 are output to register 70 of FIG. 8.

Each of the registers of FIG. 7 and FIG. 8 receive a clock signal (not shown) which corresponds to a memory access cycle of previous frame memory 44. Thus, the retrieval, selection and interpolation of pixels is all accomplished on a synchronous basis at the access rate of the previous frame memory. This enables one pixel to be interpolated for each memory access cycle.

In the two-dimensional array of shift registers illustrated in FIG. 8, there are (K+1) columns of registers and each column is made up of (L+1) shift registers. The array is first initialized to hold the (K+1) by (L+1) pixels needed for diagonal interpolation. These pixels are loaded from the front end during four memory access cycles to maintain the one-to-one relationship between memory cycles and interpolated pixels produced.

Four streams of pixels are produced by the data selector by shifting the pixel data in each of the K+1 register columns upwards. The data is shifted up L times during one shift cycle. Each shift cycle generates L pixels for each of the four output ports. The process is repeated K times. During each repetition, multiplexers 100, 102, 104 and 106 select a different column for output. When the whole process is completed, each output port will have produced L by K pixels. Each multiplexer outputs pixels corresponding to one of the four corners in a diagonal interpolation scheme.

Figure 9:
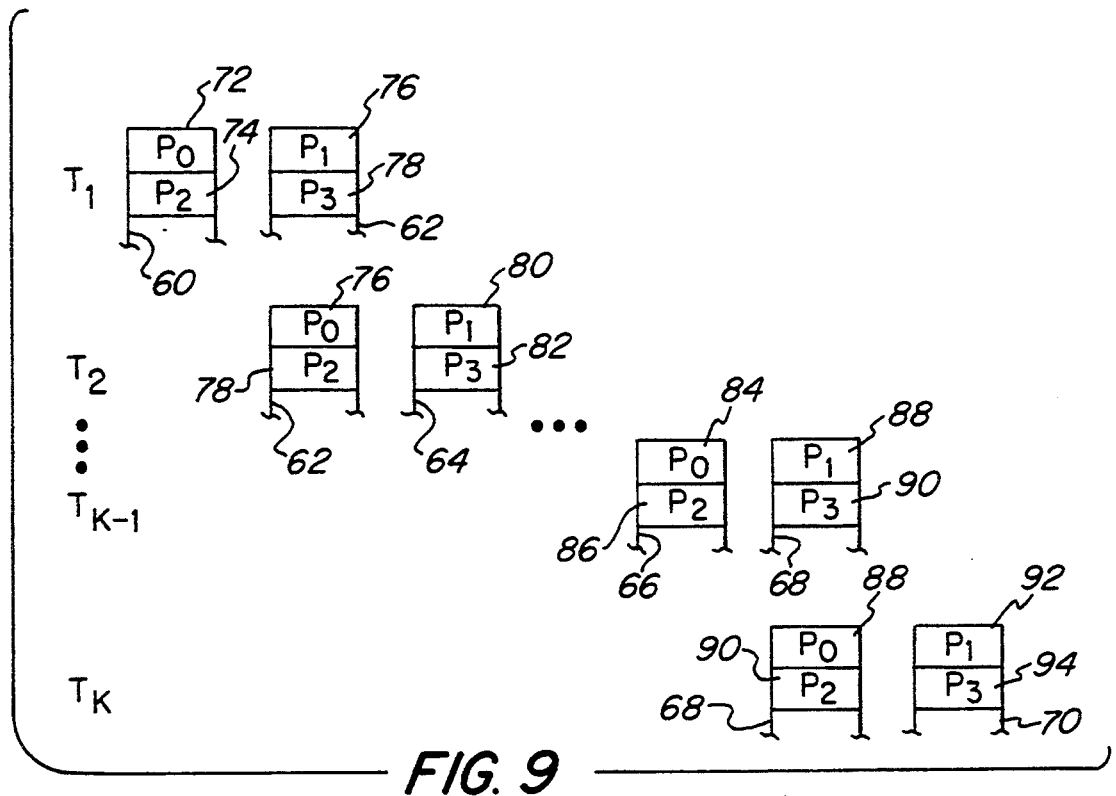
FIG. 9 is a diagrammatic illustration showing the locations of pixel data used in performing interpolations within the shift registers of FIG. 8 at different points in time.

The operation of the data selector is illustrated diagrammatically in FIG. 9. During a first cycle $T_1$, register 60 will contain a pixel $P_0$ in register 72 and a pixel $P_2$ in register 74. At the same time, register 62 holds pixel $P_1$ in register 76 and pixel $P_3$ in register 78. Referring to FIG. 8, register 72 is coupled to port 1 of multiplexer 100. Thus, at time $T_1$, multiplexer 100 will output a current $P_0$ for use together with a corresponding $P_1$, $P_2$ and $P_3$ from multiplexers 102, 104 and 106 respectively for interpolating a current pixel. Pixel $P_1$ from register 76 is output from multiplexer 102 during cycle $T_1$. Pixel $P_2$ from register 74 is output from multiplexer 104 at time $T_1$. Pixel $P_3$ from register 78 is output from multiplexer 106 at time $T_1$. Thus, at time $T_1$ the first set of four pixels necessary for a diagonal interpolation are collectively present at the outputs of multiplexers 100, 102, 104 and 106.

At a time period $T_2$, multiplexers 100, 102, 104 and 106 will output the pixel data present at the their second input ports. Specifically, as can be seen in FIG. 9, the pixel contained in register 76 will be output as $P_0$. The pixel data contained in register 80 will be output as pixel $P_1$. The data contained in register 78 will be output as pixel $P_2$ and the data present in register 82 will be output as pixel $P_3$.

At time period $T_{K-1}$, the data present in registers 84, 88, 86 and 90, respectively, will be output as pixels $P_0$, $P_1$, $P_2$ and $P_3$. Finally, at time period $T_K$, the data present in registers 88, 92, 90 and 94, respectively, will be output as pixels $P_0$, $P_1$, $P_2$ and $P_3$.

After all K cycles have been completed, each of shift registers 60, 62, 68 and 70 will be shifted up once, and the process will be repeated for the next K cycles to obtain the previous frame pixels necessary to interpolate the next row of current frame pixels for a sub-block. This process will continue for the L+1 rows of the current sub-block, after which the data for the next sub-block will be loaded into the registers of FIG. 8. It should be noted that registers 64 and 66 shown in FIG. 9 are not specifically illustrated in FIG. 8. However, those skilled in the art will appreciate that these registers are provided between registers 62 and 68 in FIG. 8. As previously indicated, there are a total of (K+1) columns of registers in the array of FIG. 8, not all of which are necessarily shown.

Figure 10:
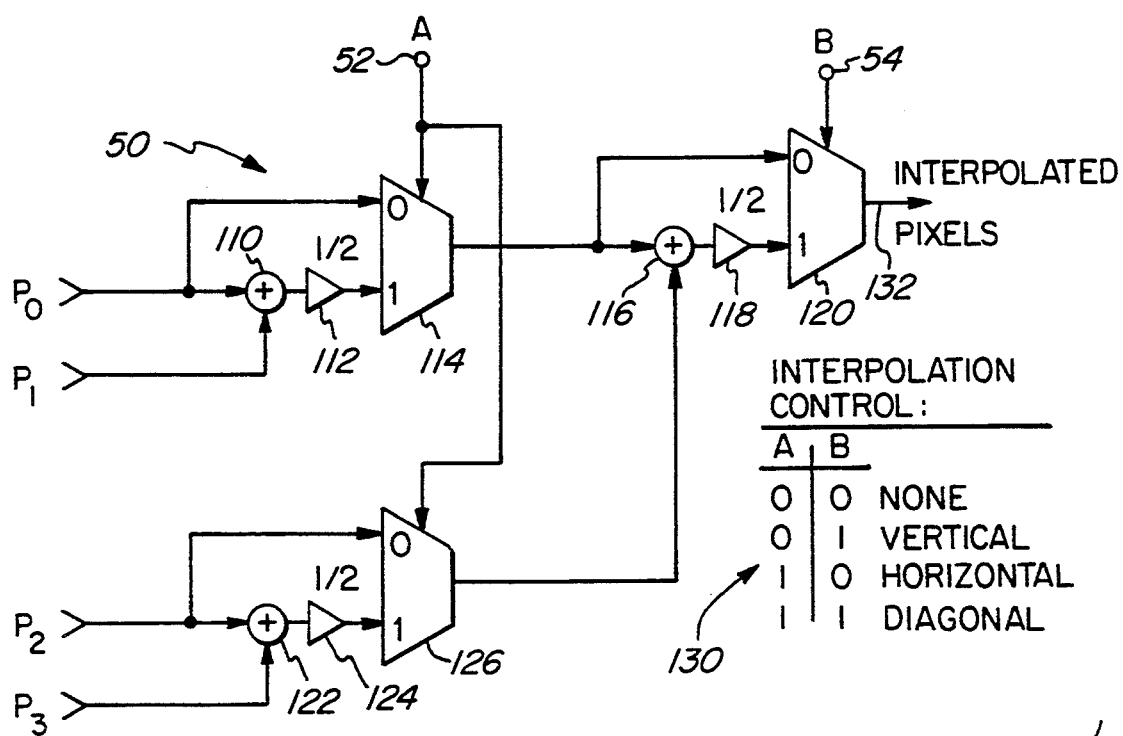
FIG. 10 is a schematic diagram of an embodiment of an averaging circuit that can be used in the apparatus of FIG. 6.

FIG. 10 illustrates the averaging circuit 50 of FIG. 6 in greater detail. The averaging circuit receives the four streams of pixels $P_0$, $P_1$, $P_2$ and $P_3$ from the data selector and performs the necessary interpolations as demanded by the displacement vector. A first interpolation control signal "A" is input at terminal 52. A second interpolation control signal "B" is input at terminal 54. A legend, 130, indicates the action taken by the averaging circuit depending upon the state of each of interpolation control signals A and B. If no interpolation is required, the pixel $P_0$ is directed to the output port 132 via multiplexers 114, 120. If vertical interpolation is needed, adder 116 and divider 118 compute the average of $P_0$ and $P_2$ for output at port 132. For horizontal interpolation, the average between $P_0$ and $P_1$ is computed by adder 110 and divider 112, for output at port 132. Finally, in the diagonal interpolation mode, the average of all four input pixels is provided. Specifically, the average of $P_0$ and $P_1$ is computed by adder 110 and divider 112. The average of $P_2$ and $P_3$ is computed by adder 122 and divider 124. These two averages are averaged by adder 116 and divider 118, for output at port 132. The implementation of the averaging circuit using simple adders and multiplexers as illustrated in FIG. 10 provides a cost effective implementation for the interpolation function.

It should now be appreciated that the present invention provides a method and apparatus for the construction of a prediction frame with half pixel interpolation. The prediction frame is used in reconstructing a current video frame of a motion compensated digital video signal. Blocks of pixels within a video frame are divided into sub-blocks. A memory architecture is provided which matches the sub-block division. A data selection circuit selects only those pixels that are needed in generating a motion compensated sub-block. The data selection circuit arranges the pixels into four parallel data streams corresponding to the four corners in a diagonal interpolation mode. An averaging circuit processes pixels from some or all of the four parallel data streams to selectively provide horizontal, vertical or diagonal interpolation or no interpolation at all. The invention can be used with virtually any block and/or sub-block size, as long as the number of pixels in each sub-block is at least the maximum number of pixels required to interpolate a pixel using a desired interpolation function and each block contains an even number of sub-blocks, For the interpolation function illustrated herein, wherein horizontal and vertical interpolation each require only two pixels, but diagonal interpolation requires four pixels, the maximum number of pixels required to interpolate a new pixel is four. The interpolation of one pixel per memory access cycle is achieved by storing and retrieving sub-blocks, instead of individual pixels, from each previous frame memory location.

Although the invention has been described in connection with a specific embodiment thereof, those skilled in the art will appreciate that numerous adaptations and modifications may be made thereto without departing from the spirit and scope of the invention as set forth in the claims.

We claim:

1. A method for processing previous frame data in a motion compensated digital video system to interpolate pixels used in reconstructing a current video frame, comprising the steps of:

arranging pixel data from a previous video frame into sub-blocks containing a plurality N of pixels;

storing said sub-blocks in a memory to enable the retrieval of at least one sub-block per memory access cycle;

retrieving a plurality M of said sub-blocks from said memory in response to a displacement vector associated with a portion of a current video frame, wherein $M \leq N$ and said M sub-blocks are retrieved in no more than M memory access cycles;

choosing a subset of pixels from said selected plurality of sub-blocks for use in interpolating pixels for said current video frame portion; and processing said subset of pixels over no more than N memory access cycles to provide N interpolated pixels for said current video frame portion.

2. A method in accordance with claim 1 wherein N is at least the maximum number of pixels necessary to obtain an interpolated pixel using a desired interpolation algorithm.

3. A method in accordance with claim 1 wherein said arranging step comprises the step of evenly dividing blocks of pixels from said previous video frame into said sub-blocks.

4. A method in accordance with claim 1 wherein horizontal, vertical and diagonal interpolation is provided using up to four previous frame pixels to obtain each interpolated current frame pixel, and said processing step comprises the steps of:

selecting four pixels from said subset of pixels for use in interpolating a current frame pixel; and averaging two horizontally or vertically spaced pixels of said selected four pixels in response to a horizontal or a vertical interpolation control signal, respectively, or averaging all of the selected four pixels in response to a diagonal interpolation control signal in order to obtain an interpolated pixel.

5. Apparatus for interpolating pixels used in reconstructing a current video frame from pixels of a previous video frame in a motion compensated digital video system, comprising:

memory means for storing sub-blocks, each sub-block containing a plurality N of pixels from said previous video frame;

means for retrieving a plurality M of said sub-blocks from said memory means in response to a displacement vector associated with a portion of a current video frame for which pixels are to be interpolated, wherein $M \leq N$ and said M sub-blocks are retrieved in no more than M access cycles of said memory means;

means for choosing a subset of pixels from said retrieved plurality of sub-blocks for use in interpolating pixels for said current video frame portion; and means for processing said subset of pixels over no more than N memory access cycles to provide N interpolated pixels for said current video frame portion.

6. Apparatus in accordance with claim 5 wherein N is at least the maximum number of pixels necessary to obtain an interpolated pixel using a desired interpolation algorithm.

7. Apparatus in accordance with claim 5 wherein:

said portion of a current video frame comprises a block of pixels corresponding in size to an integer number of said sub-blocks.

8. Apparatus in accordance with claim 5 wherein said processing means provide horizontal, vertical and diagonal interpolation using up to four previous frame pixels to obtain each interpolated current frame pixel, said processing means comprising:

means for selecting four pixels from said subset of pixels for use in interpolating a current frame pixel;

means for averaging two horizontally or vertically spaced pixels of said selected four pixels in response to a horizontal or a vertical interpolation control signal, respectively, in order to obtain a horizontally or a vertically interpolated pixel; and means for averaging all of the selected four pixels in response to a diagonal interpolation control signal in order to obtain a diagonally interpolated pixel.

9. Apparatus in accordance with claim 8 wherein:

said sub-blocks have a horizontal dimension K and a vertical dimension L; and said selecting means comprise:

a plurality K+1 of shift registers, each having L+1 stages for collectively holding said subset of pixels, and multiplexer means coupled to selected outputs of said shift registers for providing a different group of four previous frame pixels from said shift registers to said averaging means each memory access cycle.

10. Apparatus in accordance with claim 9 wherein each group of previous frame pixels comprises an upper left hand corner pixel $P_0$, an upper right hand corner pixel $P_1$, a lower right hand corner pixel $P_2$, and a lower left hand corner pixel $P_3$ defining a square, and said averaging means comprise:

first means for outputting the sum, divided by two, of pixel $P_0$ and pixel $P_1$ in response to said horizontal interpolation control signal;

second means for outputting the sum, divided by two, of pixel $P_0$ and pixel $P_3$ in response to said vertical interpolation control signal; and third means for outputting the sum, divided by four, of pixels $P_0$, $P_1$, $P_2$, and $P_3$ in response to said diagonal interpolation control signal.

11. Apparatus in accordance with claim 10 wherein said first, second and third means comprise conventional add, subtract and multiplexer circuits.

* * * * *